United States Patent [19]
Nebel

[11] 3,966,402
[45] June 29, 1976

[54] PROCESS FOR THE MANUFACTURE OF BASIC CHROME TANNING AGENTS SOLUBLE IN COLDWATER

[75] Inventor: Hans-Joachim Nebel, Ludwigshafen, Germany

[73] Assignee: BASF Aktiengesellschaft, Ludwigshafen (Rhine), Germany

[22] Filed: July 5, 1974

[21] Appl. No.: 486,239

[30] Foreign Application Priority Data
July 7, 1973 Germany............................ 2334636

[52] U.S. Cl............................... 8/94.27; 252/8.57; 252/363.5
[51] Int. Cl.$^2$........................ C14C 3/06; B01F 1/00
[58] Field of Search....................... 252/363.5, 8.57; 8/94.27; 423/544, 57; 260/438.5 C

[56] References Cited
UNITED STATES PATENTS

| | | | |
|---|---|---|---|
| 3,254,938 | 6/1966 | Rodriguez et al.................... | 8/94.27 |
| 3,402,137 | 9/1968 | Fischer et al................ | 252/363.5 X |
| 3,826,610 | 7/1974 | Komarek et al................. | 8/94.27 X |

*Primary Examiner*—Herbert B. Guynn
*Attorney, Agent, or Firm*—Johnston, Keil, Thompson & Shurtleff

[57] ABSTRACT

Process for the manufacture of powdered chromium sulfate soluble in cold water, wherein aqueous chromium sulfate solutions are evaporated in the presence of at least one glycol.

10 Claims, No Drawings

PROCESS FOR THE MANUFACTURE OF BASIC CHROME TANNING AGENTS SOLUBLE IN COLDWATER

Basic chromium salts are valued in the tanning industry as high-quality tanning agents. The most widely used tanning agent of this kind is a chromium(III) sulfate having a basicity of ⅓. Over recent years, even greater use has been made of chromium(III) sulfates masked by formate radicals, since even higher basicities may be achieved with these complexes and they have a self-neutralizing effect. The chrome tanning agents of the above kind are sold in powder form and are prepared by evaporating aqueous solutions thereof, for example by spray drying, to give the solid tanning agent.

However, the prior art powdered chrome tanning agents suffer from the drawback that they are not completely soluble in cold water having a temperature of, say, about 20°C. When the powdered chrome tanning agents are stored, the portion which is insoluble in cold water increases. This phenomenon occurs particularly at higher temperatures such as are encountered, for example, in the tropics. Their insolubility in cold water is particularly great when the basicity of the chrome tanning agents is high. However, a high degree of basicity is desirable, since this, of course, improves the liquor exhaustion, which is of economical importance on account of the better utilization of the chromium content of the tanning agent and is extremely desirable for the avoidance of waste water problems where chromium-containing waste liquors occur. Furthermore, those portions which are insoluble in cold water have a mechanically damaging effect on the leather during tanning, on account of their hardness.

For the above reason, it is an object of the present invention to provide chrome tanning powders showing maximum solubility in cold water having a temperature of from about 10° to 20°C and which provide optimum liquor exhaustion. A further object is the provision of leather having a better handle on account of the absence of insoluble residues.

This object is achieved in a process for the manufacture of powdered basic chromium sulfate which is soluble in cold water by evaporating aqueous basic chromium sulfate solutions, wherein at least one glycol, optionally monoetherified with a methyl or ethyl group, is added to the solutions prior to evaporation.

The addition of the glycols, which may be used individually or in the form of a mixture of two or more glycols, may take place before the chromium salt solutions are adjusted to the desired basicity or just before the solutions are dehydrated.

Suitable glycols for use in the present invention are mono- or poly-glycols, provided they are soluble in water, and their monomethyl and monoethyl ethers. For the sake of simplicity, these compounds are referred to below as "glycols". Where polyglycols are used, it is convenient not to exceed an average molecular weight of 2,500, although higher molecular weights do not diminish the effect of the invention.

Preferred monoglycols are those containing from 2 to 4 carbon atoms and their monomethyl and monoethyl ethers. Preferred specific compounds are ethylene glycol, 1,2-propylene glycol and 1,2-butylene glycol and methyl glycol (i.e. ethylene glycol monomethyl ether). Particular examples of polyglycols are diethylene glycol, triethylene glycol, ethyl diglycol, methyl diglycol, dipropylene glycol, tripropylene glycol and tetrapropylene glycol and adducts of ethylene oxide and/or propylene oxide with the said monoglycols or their mono-ethers as defined above. In the latter case, those compounds are preferred which have molecular weights of up to 2,000 and particularly valuable compounds for industrial use are those having average molecular weights of up to 500.

The amounts of glycol added may be varied within wide limits and is advantageously from 0.1 to 10% and preferably from 2 to 3%, based on the weight of dry chromium salt in the solution. The chrome tanning solutions containing said additives may be converted to powder in the usual manner, for example by spray drying.

Particularly suitable chromium salts for use in the process of the invention are those obtained by, for example, reduction of alkali metal bichromates, preferably sodium dichromate, by means of sulforous acid. This produces chromium sulfates showing various degrees of basicity. Basic chromium sulfates are those containing not only sulfate ions but also hydroxyl ions in the molecule. The tanner defines such basic salts by percentages. For example, a 33⅓% basic chromium sulfate is one containing anions of which one third are hydroxyl ions and two thirds are sulfate ion equivalents. In the present invention, preferred basic chromium sulfates are those having a basicity of 33⅓% and more, preferably one of up to 70%. Chromium sulfates having basicities of from 50 to 70% are defined as being "highly basic" chromium sulfates. The measure of the present invention now makes it possible to dissolve basic chromium sulfates in cold water, including those in the latter group.

The basicity may be adjusted, for example by means of NaOH, to any desired value.

Other suitable chromium salts are, as mentioned above, chromium sulfates masked by organic radicals. In this case, the starting materials are usually existing chromium sulfates or chrome alum, which are then complexed with, say, formic acid likewise in known manner. One usual complex is a hexahydroxysulfate-tetraformate-tetrachromium complex, which also contains sodium sulfate and water of crystallization (combined as aquo groups).

Such a complex is a highly basic compound (its basicity is from 50 to 70%), which has previously been only sparingly soluble in cold water. However, when the said glycols are added, there is the surprising result that the chromium salt shows, after removal of the water, excellent solubility in cold water. In view of previous knowledge to the effect that all volatile portions should be removed during spray drying, the effect of the low molecular weight gylcols in particular must be regarded as doubly surprising. Clearly some of the glycol remains in an absorbed state in the dry product and is thus subsequently capable of acting as solubilizer and causing the less soluble portions of chromium salt to pass into clear solution at lower temperatures.

Tanning is carried out with the chromium salts modified in accordance with the present invention in exactly the same manner as conventionally carried out with unmodified chromium salts.

Such tanning is generally carried by milling a de-limed and pickled pelt in a liquor consisting of from about 0.5 to 2 parts of the appropriate chromium salt and 10 parts of water, for from about 2 to 5 hours, and then drying the pelt in conventional manner or, if desired, subjecting it to a finishing treatment. No change in the tanning efficiency of the chrome tanning agents is observed compared with conventional powdered chrome tanning agents.

The chrome tanning agents prepared in the manner of the present invention may also be used in conjunction with other vegetable or synthetic tanning agents as is the case with previous tanning agents, without there being any change in the results obtained.

The technical advance is that much better liquor exhaustion is achieved, even in a cold liquor, due to the improved solubility of the tanning agent, and that the waste liquors obtained after tanning contain much less chromium, this being very important with regard to the present-day regulations concerning the protection of inland waters.

The manufacture and use of the novel chrome tanning agents are illustrated in the following Examples, in which parts are by weight.

EXAMPLE 1

300 parts of sodium bichromate are dissolved in 500 parts of water. Sulfur dioxide is passed through this aqueous solution until no further hexavalent chromium is detectable.

a. The resulting 35%-basic chromium sulfate solution is dried to a powder in a spray drier. The solubility of the product in cold water is determined by shaking 10 g of the powder in 20 ml of water for 1 hour at 20°C followed by filtration, washing with 2 ml of water and drying of the residue. The latter is found to be 2.5% by weight, based on the dry weight of chromium sulfate. When the powder is heated for 70 hours at 60°C, the insoluble residue rises to 5%.

b. In a second test, 15 parts of methyl diglycol are added to the solution obtained as described above, which is then stirred and dried to a powder, also in a spray drier. In this case, the residue insoluble in cold water is only 0.05%. When the powder is heated at 60°C for 70 hours, the insoluble residue has a value of only 0.5%.

c. The solution obtained above is mixed with 20 parts of a polyglycol having a molecular weight of 400 and the mixture is stirred and dried as described above. The residue insoluble in cold water is 0.1%. After heating at 60°C for 70 hours, this value rises to 0.6%.

d. The resulting solution is mixed with 30 parts of glycol, stirred and then dried to a powder with a spray drier. The residue insoluble in cold water is now 0.1% and, after 70 hours of heating at 60°C, 0.5%.

EXAMPLE 2

200 Parts of a solution containing 33 parts of 33⅓%-basic chromium sulfate and 14 parts of sodium sulfate are stirred with 9 parts of 85% formic acid, and the solution is then adjusted to a basicity of 50% by the addition of 15 parts of lime.

a. The resulting solution is dried in known manner to a powder without any addition, using a spray drier. The residue insoluble in cold water is 6.3% and this rises to 22.6% after heating at 60°C for 70 hours.

b. Prior to the addition of formic acid, 1 part of a commercial mixture of di- and tri-propylene glycols is added to the reaction mixture. After working up and drying in a spray drier, the residue insoluble in cold water is only 0.4%. After heating at 60°C for hours, this value is 3%.

c. Prior to drying, 3 parts of a commercial mixture of di- and tri-propylene glycols are added to the mixture. The powder now has a portion of only 0.1% which is insoluble in cold water, this value rising to 1% after heating at 60°C for 70 hours.

EXAMPLE 3

A leather which has been pickled with 0.8% w/w of 85% formic acid, 8% w/w of common salt and 100% w/w of water (percentages based on the weight of the leather) (for 2 hours at a pH of from 2.8 to 4.2 is milled in a liquor containing 70% of water and 7.8% of a tanning agent obtained as described in Example 2c, for from 3 to 4 hours, and then horsed up overnight. Working-up is carried out as usual. The resulting leather shows no difference from one tanned with a prior art chrome tanning agent masked with formic acid except that it has a softer handle, this being due to the absence of insoluble residues in the tanning agent.

Similar results are obtained with tanning agents obtained by the procedures described in Examples 1b, 1c, 1d, 2b and 2d.

I claim:

1. A process for the manufacture of a powdered, basic chromium sulfate which is soluble in cold water, said process comprising the step of evaporating an aqueous solution of basic chromium sulfate in the presence of 0.1 to 10% by weight, with reference to the weight of dry chromium salt in the solution, of at least one glycol compound selected from the group consisting of alkylene glycol of 2 to 4 carbon atoms; the monomethyl or monoethyl ether of said glycol; and higher molecular weight oligomers and polymers of said glycol, adducts thereof with ethylene oxide and/or propylene oxide, or the monomethyl or monoethyl ethers of said oligomers, polymers and adducts, with the proviso that said higher molecular weight compounds have a molecular weight up to about 2,500.

2. A process as claimed in claim 1, wherein the aqueous basic chromium sulfate solution has a basicity of from 33⅓ to 70%.

3. A process as claimed in claim 1, wherein the glycol compound added is selected from the group consisting of mono- and poly-glycols, the polyglycols having molecular weights of up to 2,500.

4. A process as claimed in claim 3, wherein the glycol compound added is monoetherified with a methyl or ethyl group.

5. A process as claimed in claim 1, wherein the glycol compound added is selected from the group consisting of glycols having from 2 to 4 carbon atoms and their monomethyl or monoethyl ethers.

6. A process as claimed in claim 1, wherein the glycol compound added is an adduct of ethylene oxide and/or propylene oxide with a monoglycol 7. Powdered basic chromium sulfate soluble in cold water and obtained by the process of claim 1.

8. A powdered chromium sulfate as claimed in claim 7 wherein the glycol compound is selected from the group consisting of alkylene glycols having from 2 to 4 carbon atoms and their monomethyl or monoethyl ethers.

9. A powdered chromium sulfate as claimed in claim 7 wherein the glycol compound is a mono- or polyglycol, the polyglycol having a molecular weight of up to 2,500.

10. A powdered chromium sulfate as claimed in claim 9 wherein the glycol compound is monoetherified with one methyl or ethyl group.

* * * * *